United States Patent
Richter et al.

(10) Patent No.: US 11,920,709 B2
(45) Date of Patent: Mar. 5, 2024

(54) EXPANSION LOOP FOR COPPER PIPING SYSTEM

(71) Applicant: The Metraflex Company, Chicago, IL (US)

(72) Inventors: James Reynold Richter, Chicago, IL (US); James D. Clauss, Frankfort, IL (US); Michael Albert Taylor, Mundelein, IL (US); Daniel T Holbach, Palatine, IL (US); Daniel R Kish, Chicago, IL (US)

(73) Assignee: The Metraflex Company, Chicago, IL (US)

( * ) Notice: Subject to any disclaimer, the term of this patent is extended or adjusted under 35 U.S.C. 154(b) by 0 days.

(21) Appl. No.: 17/355,879

(22) Filed: Jun. 23, 2021

(65) Prior Publication Data
US 2022/0412491 A1   Dec. 29, 2022

(51) Int. Cl.
*F16L 27/113*   (2006.01)
(52) U.S. Cl.
CPC ................... *F16L 27/113* (2013.01)
(58) Field of Classification Search
CPC ...... F16L 11/115; F16L 11/15; F16L 27/0861; F16L 51/04
See application file for complete search history.

(56) References Cited

U.S. PATENT DOCUMENTS

| | | | |
|---|---|---|---|
| 104,284 A | 6/1870 | Donnelly et al. | |
| 268,467 A * | 12/1882 | Dunlap | F16L 27/0861 285/190 |
| 411,518 A | 9/1889 | Collis | |
| 700,378 A | 5/1902 | Schmidt | |
| 1,371,981 A * | 3/1921 | Rose | F16L 11/15 285/353 |
| 2,030,218 A * | 2/1936 | James | F16L 51/04 138/110 |
| 2,170,557 A * | 8/1939 | Guarnaschelli | F16L 51/04 138/110 |

(Continued)

FOREIGN PATENT DOCUMENTS

| | | | | |
|---|---|---|---|---|
| DE | 585775 C | * | 6/1931 | ............. F16L 11/15 |
| DE | 202016101495 U1 | * | 7/2017 | ............. F16L 11/15 |

(Continued)

OTHER PUBLICATIONS

Extended European Search Report from corresponding European application No. 22179590.9, dated Feb. 13, 2023.

*Primary Examiner* — Matthew Troutman
*Assistant Examiner* — Fannie C Kee
(74) *Attorney, Agent, or Firm* — Greer, Burns & Crain, Ltd.

(57) ABSTRACT

An expansion loop for a piping system. The expansion loop has a first flexible conduit with a first end and a second end and a second flexible conduit with a first end and a second end. A first rigid conduit is connected between the first ends of the first and second flexible conduits. Additional rigid conduits are connected to both of the second ends of the flexible conduits. These additional rigid conduits include a stainless-steel elbow, a conversion conduit, and a copper conduit. The expansion loop may be installed wherein the flexible conduits are bent, when fluid flows, the flexible conduits straighten out and are not bent.

20 Claims, 2 Drawing Sheets

(56) References Cited

U.S. PATENT DOCUMENTS

| | | | |
|---|---|---|---|
| 2,256,388 A | | 9/1941 | Fentress |
| 2,511,335 A | | 6/1950 | Guarnaschelli |
| 3,375,045 A | | 3/1968 | Zeidler |
| 4,002,357 A | | 1/1977 | Bennett |
| 4,244,543 A | | 1/1981 | Ericson |
| 5,195,784 A | | 3/1993 | Richter |
| 5,803,506 A | * | 9/1998 | Argersinger ............ F16L 51/04 285/226 |
| 9,631,743 B2 | * | 4/2017 | Richter .................... F16L 51/04 |
| 2009/0194992 A1 | * | 8/2009 | Bochenek ............... F16L 51/04 285/61 |
| 2009/0224533 A1 | * | 9/2009 | Richter .................... F16L 51/04 285/61 |
| 2016/0091120 A1 | * | 3/2016 | Richter .................... F16L 51/04 248/60 |
| 2018/0023730 A1 | * | 1/2018 | Argersinger ............ F16L 11/115 285/179 |
| 2019/0162349 A1 | | 5/2019 | Leung et al. |
| 2020/0116281 A1 | * | 4/2020 | Grayson ................. F16L 11/15 |
| 2020/0182385 A1 | * | 6/2020 | Westgarth ........... F16L 27/0861 |
| 2022/0146162 A1 | | 5/2022 | Hamadate et al. |

FOREIGN PATENT DOCUMENTS

| | | | | |
|---|---|---|---|---|
| WO | WO-2007100625 A2 | * | 9/2007 | .......... F16L 27/0861 |
| WO | WO-2016049161 A1 | * | 3/2016 | .............. F16L 51/04 |
| WO | WO-2020077329 A1 | * | 4/2020 | .............. F16L 11/15 |
| WO | 2021019960 A1 | | 2/2021 | |

\* cited by examiner

EXPANSION LOOP FOR COPPER PIPING SYSTEM

CROSS-REFERENCES TO RELATED APPLICATIONS

None.

FIELD OF THE INVENTION

The present invention relates to an expansion loop for a copper piping system.

BACKGROUND

In the construction of buildings and other structures, it is known to use expansion loops that include a flexible portion to allow for movement of the conduit. The movement can be intentional, for example, based upon thermal changes, or misalignment in a piping system, or unintentional, such as from a natural disaster, like an earthquake. Additionally, the movement can dampen vibration of the conduits and reduce the transmission of noise through the conduit. Such an expansion loop is disclosed, for example, in U.S. Pat. No. 5,195,784.

Many buildings contain refrigeration systems that utilize conduits for transporting fluids. The conduits, or pipes, that are utilized in such refrigeration systems are typically copper. Additionally, these fluids are usually pressurized, therefore requiring any conduits to be rated for such a highly pressurized system, i.e., rated for at least 640 or at least 700 psi. However, flexible copper conduits are not rated high enough for such systems.

Additionally, conventional expansion loops are made of stainless steel and not suited for connecting to copper conduits. As would be appreciated, the connection between different metals can be problematic as one metal can corrode the other metal overtime. Moreover, the connection between dissimilar metals is usually a weak point for the piping system. While, such a weak point is undesirable in most piping systems, it would be especially undesirable in a highly pressurized system like a refrigeration piping system.

Thus, it would be desirable to provide for a flexible conduit that is suited for the pressurized fluids of refrigeration systems and that can easily be installed within the copper conduits of such systems.

SUMMARY OF THE INVENTION

A new flexible conduit that is suited for connection to copper pipes and is rated to handle the pressure requirements of a refrigeration system has been invented.

According to a first aspect of the present invention, the present invention may be broadly characterized as providing an expansion loop for a piping system, having a first flexible conduit with a first end and a second end, a second flexible conduit with a first end and a second end, a first rigid conduit connected between the first ends of the first and second flexible conduits, a second rigid conduit connected to a second end of the first flexible conduit and including a conversion conduit and a copper conduit, the second rigid conduit being stainless steel, and, a third rigid conduit connected to a second end of the first flexible conduit and including a conversion conduit and a copper conduit, the third rigid conduit being stainless steel. The first and second flexible conduits are rated for 640 psi applications.

The second and third rigid conduits may include elbow portions.

The first and second flexible conduits may be stainless steel. The first and second flexible conduits may also include braided hoses.

The first rigid conduit may be stainless steel.

The first rigid conduit may include two elbow portions.

The first rigid conduit may include a bracket configured to couple the expansion loop to a support structure.

According to a second aspect of the present invention, the present invention, generally may be characterized as providing an expansion loop for a piping system having at least one stainless steel, flexible conduit, a first rigid conduit connected to the at least one flexible conduit, the first rigid conduit including an elbow portion, and, a second rigid conduit comprising stainless steel and connected to the at least one flexible conduit, the second rigid conduit including a conversion conduit and a copper conduit.

The expansion loop may also include second stainless steel, flexible conduit that is connected to the first rigid conduit. The expansion loop may also include a third rigid conduit being stainless steel and connected to the second flexible conduit, the third rigid conduit may include a conversion conduit and a copper conduit. The second rigid conduit include an elbow portion connected between the conversion conduit and the at least one flexible conduit.

In yet a third aspect of the present invention, the present invention may be broadly characterized as providing a method of installing an expansion loop into a piping system, in which the expansion loop has at least two rigid conduits and a flexible portion between the two rigid conduits, wherein the flexible portion has a neutral orientation in which two flexible conduits forming the flexible portion are not bent. The method includes attaching one of the at least two rigid conduits to a first pipe of the piping system, attaching the other of the at least two rigid conduits to a second pipe of the piping system such that the two flexible conduits of the flexible portion are not in the neutral orientation and are in a compressed or extended orientation, and after the at least two rigid conduits have been attached to the first and second pipes, flowing a fluid from one of the first and second pipes of the piping system, through the expansion loop, and to the other of the first and second pipes of the piping system so that the flexible portion returns to the neutral orientation as a result of a temperature of the fluid.

The two flexible conduits of the flexible portion may be in an extended orientation. The fluid may be a hot fluid.

The two flexible conduits of the flexible portion may be in a compressed orientation. The fluid may be a cold fluid.

A third rigid conduit may connect the at least two flexible conduits. The third rigid conduit, the at least two rigid conduits, and the two flexible conduits may be stainless steel. The at least two rigid conduits may each further include a conversion conduit and a copper conduit.

The method may include anchoring the expansion loop to a support structure.

These and other aspects and embodiments of the present invention, which may be combined with each other in any manner, will be appreciated by those of ordinary skill in the art based upon the following description of the drawings and detailed description of the preferred embodiments.

BRIEF DESCRIPTION OF THE DRAWINGS

The attached figures in the drawings will make it possible to understand how the invention can be produced. In these figures, similar reference numbers denote similar elements.

DETAILED DESCRIPTION OF THE PREFERRED EMBODIMENTS

A new expansion loop for use in a refrigeration piping system has been invented. Surprisingly, it has been found that using rigid connectors having a copper pipe connected to a stainless-steel portion, via a conversion conduit, does not reduce the ability for the expansion loop to operate effectively and efficiently in refrigeration systems. Thus, the expansion loop allows for the stainless-steel flexible conduits, which have a higher-pressure rating, to be used to a copper piping system. Additionally, when installing such an expansion loop, depending on the temperature of the fluid flowing therethrough, the flexible conduits are preferably either in a compressed or an extended orientation in which the flexible conduits are bent. Once installed and fluid flows through the expansion loop, and as a result of thermal expansion or contraction, the flexible conduits return to a neutral orientation in which the flexible conduits are not bent.

Accordingly, with reference the attached drawings, one or more embodiments of the present invention will now be described with the understanding that the described embodiments are merely preferred and are not intended to be limiting.

Figure 1:
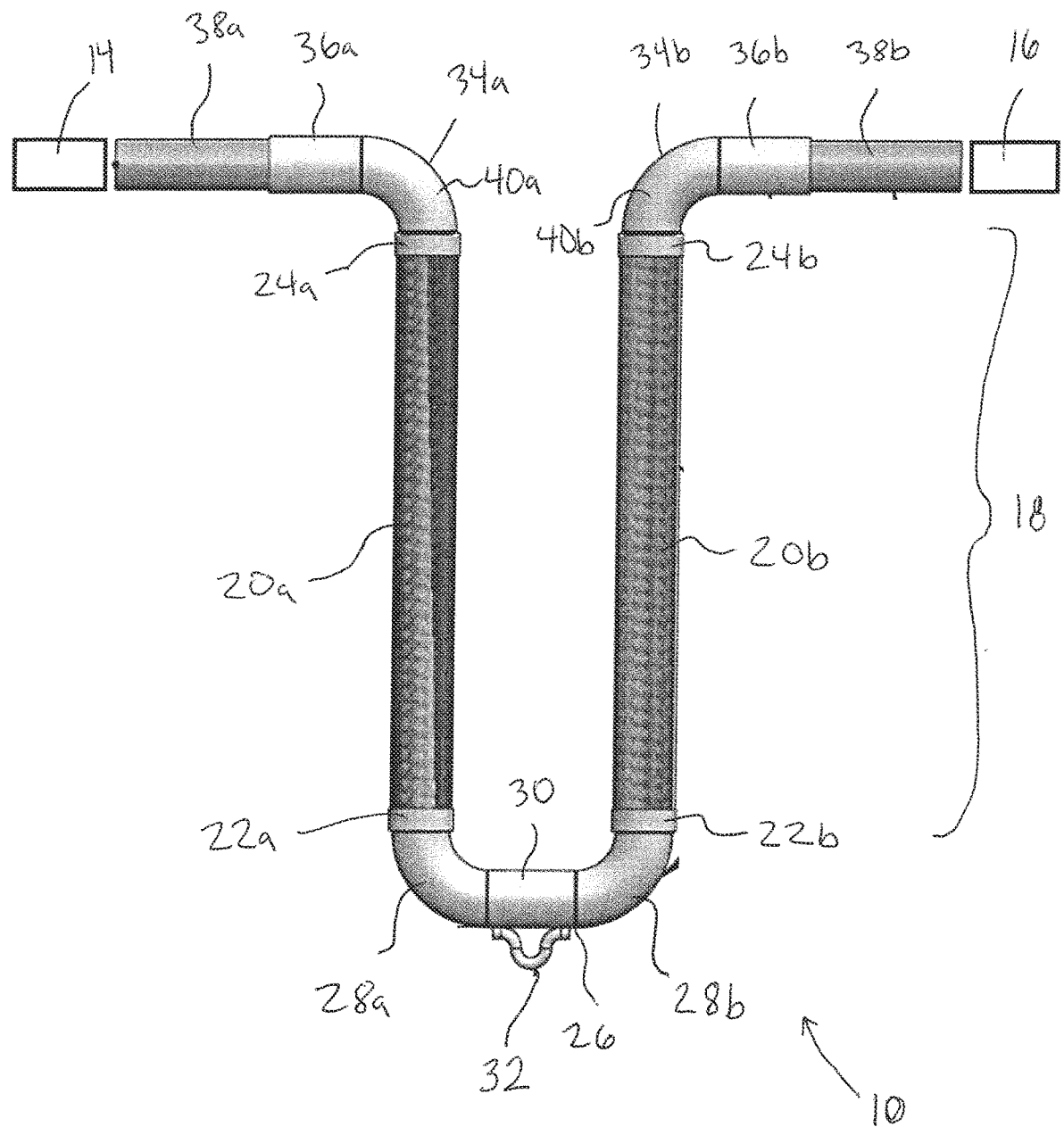
FIG. 1 is a top view of an expansion loop according one or more embodiments to the present invention.

As shown in FIG. 1, the present invention provides an expansion loop 10 for a piping system and particularly a piping system having copper pipes 14, 16. The expansion loop 10 has a flexible section 18, which in the preferred embodiment includes two flexible conduits 20a, 20b.

Each flexible conduit 20a, 20b includes a first end 22a, 22b and a second end 24a, 24b. As shown in FIG. 1, in the depicted embodiment, the two flexible conduits 20a, 20b are not bent or under bending stresses and longitudinal axes (extending from the first ends 22a, 22b to the second ends 24a, 24b) of the two flexible conduits 20a, 20b are generally parallel. Thus, a "neutral" orientation is when the flexible conduits 20a, 20b are not under any bending stresses or moments. Accordingly, in the depicted embodiment, in the neutral orientation, a distance between the first ends 22a, 22b of the flexible conduits 20a, 20b is generally the same as a distance between the second end 24a, 24b of the flexible conduits 20a, 20b.

Each of the flexible conduits 20a, 20b may be an inner corrugated hose with an outer braided cover in which one or both formed of stainless steel. In a preferred embodiment, the flexible conduits 20a, 20b include stainless steel braided hoses with a braid of a double layer of Type 304 stainless Steel. Additionally, it is preferred that the flexible conduits 20a, 20b include a corrugated metal hose with a corrugated hose of Type 321 stainless steel. The flexible conduits 20a, 20b are rated for applications of at least 640 psi and preferably at least 700 psi.

A first rigid conduit 26 is connected between the first ends 22a, 22b of the flexible conduits 20a, 20b. The terms "first," "second," "third," etc. are used merely for clarity and are not intended to define any number of elements or specifically name any particular elements or features of the present expansion loop 10.

The first rigid conduit 26 may be formed of stainless steel. The first rigid conduit 26 includes two elbow portions 28a, 28b separated by a linear, or straight, portion 30. The depicted elbow portions 28a, 28b are each 90-degree bends. This is merely preferred. Finally, the first rigid conduit 26 may include a bracket 32 which allows the expansion loop 10 to be supported by a support structure like a wall or a beam.

The second ends 24a, 24b of the flexible conduits 20a, 20b are each connected to, respectively, to second and third rigid conduits 34a, 34b.

Both of the second and third rigid conduits 34a, 34b include a copper conduit 38a, 38b. The copper conduits 38a, 38b may be straight, or unbent, conduits.

The second and third rigid conduits 34a, 34b also include elbow portions 40a, 40b that are formed of stainless steel, preferably Schedule 40 S Type 304 stainless steel. The depicted elbow portions 40a, 40b are each 90-degree bends. Again, this is merely preferred, and other angles or ranges may be used, for example, elbow portions 40a, 40b may each have 45-degree bends.

Each elbow portion 40a, 40b is connected to one of the copper conduit 38a, 38b by a conversion conduit 36a, 36b. A silver brazing material is applied to connect the copper metal components to the stainless-steel components. The silver brazing material will provide a sufficient connection and is able to accommodate the different expansion coefficients for the different metals.

As noted above, it has surprisingly been found that such an expansion loop 10 is able to safely operate in a high-pressure refrigeration system even with the use of two different metal materials.

Specifically, the expansion loop 10 may be installed into a piping system by attaching the second rigid conduit 34a to one of the two pipes 14, 16 and then attaching the third rigid conduit 34b to the other of the two pipes 14, 16. In attaching the third rigid conduit 34b, the axes of the two flexible conduits 20a, 20b of the flexible section 18 are not parallel. Thus, the distances between, on one hand, the first ends 22a, 22b and, on the other hand, the second ends 24a, 24b are not the same and differ by at least 10%.

Figure 2:
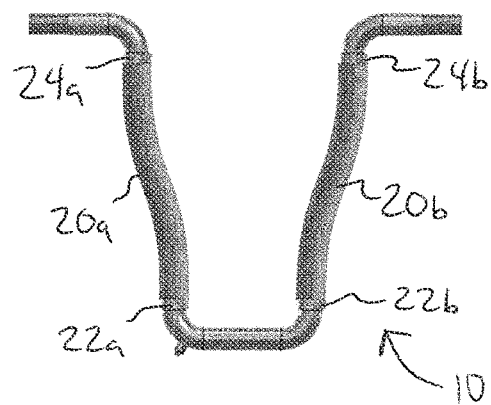
FIG. 2 is a top view of an expansion loop according to the present invention in which the flexible conduits are in an extended orientation.

For example, as shown in FIG. 2, the flexible conduits 20a, 20b may be installed in an extended orientation. In the extended orientation of the depicted embodiment, the longitudinal axes of the flexible conduits 20a, 20b are angled so as to intersect proximate the first ends 22a, 22b of the two flexible conduits 20a, 20b (relative to the second ends 24a, 24b). In other words, the first ends 22a, 22b are closer together compared to the second ends 24a, 24b. The extended orientation is believed to be most suitable when the piping system is for a hot fluid ("hot" meaning having a temperature that is greater than the ambient temperature).

Figure 3:
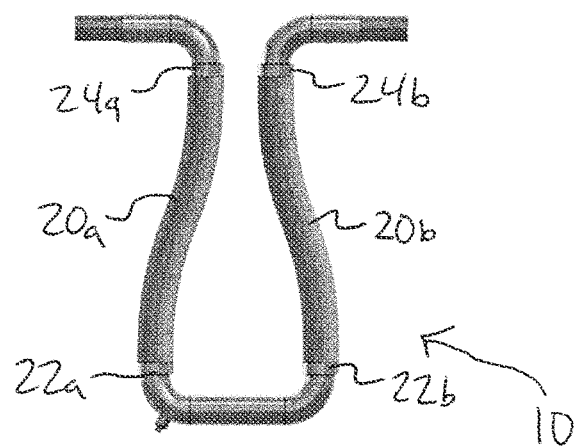
FIG. 3 is a top view of an expansion loop according to the present invention in which the flexible conduits are in a compressed orientation.

Alternatively, as shown in FIG. 3, the flexible conduits 20a, 20b may be installed in a compressed orientation. In the compressed orientation of the depicted embodiment, the longitudinal axes of the flexible conduits 20a, 20b are angled so as to intersect proximate the second ends 24a, 24b of the two flexible conduits 20a, 20b (relative to the first ends 22a, 22b). In other words, the second ends 24a, 24b are closer together compared to the first ends 22a, 22b. The compressed orientation is believed to be most suitable when the piping system is for a cold fluid ("cold" meaning having a temperature that is lower than the ambient temperature).

Once the expansion loop 10 is installed in either the compressed orientation (FIG. 3) or the extended orientation (FIG. 2), a fluid may be allowed to flow through the piping system. For example, the fluid may flow from one of the pipes 14, 16, through the expansion loop 10, and then to the other of the two pipes 14, 16. As a result of the temperature of the fluid now flowing through the expansion loop 10, the flexible section 18 transitions to the neutral orientation (FIG. 1 of the depicted embodiment) in which the longitudinal axes of the flexible conduits 20a, 20b are mostly parallel and/or the distances between the first ends 22a, 22b and the second ends 24a, 24b are generally the same. This method of installation is believed to prolong the life of the expansion loop 10 in use.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of my contribution to the art.

The invention claimed is:

1. An expansion loop for a piping system, the expansion loop comprising:
   a first flexible conduit having a first end and a second end;
   a second flexible conduit having a first end and a second end;
   a first rigid conduit connected between the first ends of the first and second flexible conduits;
   a second rigid conduit connected to the second end of the first flexible conduit and including a rigid conversion conduit and a copper conduit, a portion of the second rigid conduit comprising stainless steel, the rigid conversion conduit between the copper conduit and the portion of the second rigid conduit comprising stainless steel; and,
   a third rigid conduit connected to the second end of the second flexible conduit and including a rigid conversion conduit and a copper conduit, a portion of the third rigid conduit comprising stainless steel, the rigid conversion conduit between the copper conduit and the portion of the third rigid conduit comprising stainless steel.

2. The expansion loop of claim 1, wherein the second and third rigid conduits comprise elbow portions.

3. The expansion loop of claim 1, wherein the first and second flexible conduits comprise stainless steel.

4. The expansion loop of claim 3, wherein the first and second flexible conduits comprise braided hoses.

5. The expansion loop of claim 1, wherein the first rigid conduit comprises stainless steel.

6. The expansion loop of claim 1, wherein the first rigid conduit comprises two elbow portions.

7. The expansion loop of claim 1, wherein the first rigid conduit comprises a bracket configured to couple the expansion loop to a support structure.

8. An expansion loop for a piping system, the expansion loop comprising:
   at least one flexible conduit, the at least one flexible conduit comprising stainless steel;
   a first rigid conduit connected to the at least one flexible conduit, the first rigid conduit comprising an elbow portion; and,
   a second rigid conduit comprising stainless steel and connected to the at least one flexible conduit, the second rigid conduit including a rigid conversion conduit and a copper conduit, the rigid conversion conduit between the copper conduit and a portion of the second rigid conduit comprising the stainless steel.

9. The expansion loop of claim 8, further comprising:
   a second flexible conduit comprising stainless steel and connected to the first rigid conduit.

10. The expansion loop of claim 9, further comprising:
    a third rigid conduit comprising stainless steel and connected to the second flexible conduit, the third rigid conduit including a rigid conversion conduit and a copper conduit, the rigid conversion conduit between the copper conduit and a portion of the third rigid conduit comprising the stainless steel.

11. The expansion loop of claim 8, wherein the second rigid conduit comprises an elbow portion connected between the conversion conduit and the at least one flexible conduit.

12. A method of installing an expansion loop into a piping system, the expansion loop comprising at least two rigid conduits and a flexible portion between the two rigid conduits and having two flexible conduits, wherein the flexible portion has a neutral orientation in which the two flexible conduits are not bent, the method comprising:
    attaching one of the at least two rigid conduits to a first pipe of the piping system;
    attaching the other of the at least two rigid conduits to a second pipe of the piping system, such that the two flexible conduits of the flexible portion are not in a neutral orientation and are in a compressed or extended orientation; and,
    after the at least two rigid conduits have been attached to the first and second pipes, thermally expanding or contracting the flexible portion so that the flexible portion returns to the neutral orientation by flowing a fluid from one of the first and second pipes of the piping system, through the expansion loop, and to the other of the first and second pipes of the piping system, wherein the flexible portion returns to the neutral orientation as a result of a temperature of the fluid.

13. The method of claim 12, wherein the two flexible conduits of the flexible portion are in an extended orientation.

14. The method of claim 13, wherein the fluid comprises a hot fluid.

15. The method of claim 12, wherein the two flexible conduits of the flexible portion are in a compressed orientation.

16. The method of claim 15, wherein the fluid comprises a cold fluid.

17. The method of claim 12, wherein a third rigid conduit connects the at least two flexible conduits.

18. The method of claim 17, wherein the third rigid conduit, the at least two rigid conduits, and the two flexible conduits comprise stainless steel.

19. The method of claim 18, wherein the at least two rigid conduits each further comprise a conversion conduit and a copper conduit.

20. The method of claim 12, further comprising:
    anchoring the expansion loop to a support structure.

* * * * *